United States Patent
Whatmough et al.

(10) Patent No.: US 10,447,412 B2
(45) Date of Patent: Oct. 15, 2019

(54) COMMUNICATIONS DEVICE AND METHOD

(71) Applicant: ARM LIMITED, Cambridge (GB)

(72) Inventors: Paul Nicholas Whatmough, Cambridge, MA (US); George Smart, Norfolk (GB); Shidhartha Das, Upper Cambourne (GB); David Michael Bull, Cambridge (GB)

(73) Assignee: ARM Limited, Cambridge (GB)

( * ) Notice: Subject to any disclaimer, the term of this patent is extended or adjusted under 35 U.S.C. 154(b) by 21 days.

(21) Appl. No.: 15/577,487

(22) PCT Filed: Apr. 15, 2016

(86) PCT No.: PCT/GB2016/051056
§ 371 (c)(1),
(2) Date: Nov. 28, 2017

(87) PCT Pub. No.: WO2016/193657
PCT Pub. Date: Dec. 8, 2016

(65) Prior Publication Data
US 2018/0152252 A1 May 31, 2018

(30) Foreign Application Priority Data
Jun. 2, 2015 (GB) .................................. 1509470.9

(51) Int. Cl.
*H04B 7/24* (2006.01)
*H04B 13/00* (2006.01)
*H04B 1/3827* (2015.01)

(52) U.S. Cl.
CPC ........... *H04B 13/005* (2013.01); *H04B 1/385* (2013.01)

(58) Field of Classification Search
CPC ........ H04B 5/0031; H04B 1/44; H04B 10/11; H04B 10/1143; H04B 10/1149;
(Continued)

(56) References Cited

U.S. PATENT DOCUMENTS

| 8,489,027 B2 * | 7/2013 | Hwang | ................ H04B 13/005 340/572.1 |
| 2001/0002924 A1 * | 6/2001 | Tajima | ................... H04B 13/00 375/271 |

(Continued)

FOREIGN PATENT DOCUMENTS

| EP | 1 657 852 | 5/2006 |
| EP | 2 018 729 | 1/2009 |

OTHER PUBLICATIONS

International Search Report and Written Opinion of the ISA of PCT/GB2016/051056, dated Jul. 15, 2016, 12 pages.
(Continued)

*Primary Examiner* — Ajibola A Akinyemi
(74) *Attorney, Agent, or Firm* — Nixon & Vanderhye P.C.

(57) ABSTRACT

A device comprises a coupling configured to couple signals to and from a communications path including at least a part of a human or animal body; a data transmitter coupled to the coupling and configured to transmit, from time to time, a data signal of at least a predetermined temporal duration via the communications path; and a data receiver coupled to the coupling and configured to detect the presence of a signal on the communications path at sets of one or more successive detection instances disposed between successive transmissions of the data signal by the data transmitter, the data receiver being configured so that the successive detection instances of a set are temporally separated by no more than the predetermined temporal duration; the device being configured to initiate a processing operation in response to a detection by the data receiver of the presence of a signal on the communications path.

16 Claims, 8 Drawing Sheets

(58) Field of Classification Search
CPC .... H04B 10/116; H04B 10/40; H04B 10/502;
H04B 10/60; H04B 1/525; H04B 3/548;
H04B 7/0413; H04B 1/40; H04B 1/401;
H04B 5/0037; H04B 5/02; H04B 7/0617;
H04B 1/04
USPC .......................................................... 455/39
See application file for complete search history.

(56) References Cited

U.S. PATENT DOCUMENTS

| | | |
|---|---|---|
| 2010/0061395 A1 | 3/2010 | Park et al. |
| 2011/0182222 A1 | 7/2011 | Patel et al. |
| 2012/0033584 A1 | 2/2012 | Corroy |
| 2012/0171954 A1* | 7/2012 | Rudland .............. H04B 13/005 455/41.1 |
| 2016/0006593 A1* | 1/2016 | Asjadi ................ H04L 27/2605 375/295 |

OTHER PUBLICATIONS

Combined Search and Examination Report of GB 1509470.9, dated Dec. 16, 2015, 8 pages.
Breva et al. "The Design and Software Implementation of a MAC Protocol for Body-Coupled Communication Systems, " in Global Telecommunications Conference, Dec. 2011, pp. 1-5, 5-9.
Examination Report dated Oct. 2, 2018 in GB Application No. 1509470.9, 4 pages.
Examination Report for GB Application No. 1509470.9 dated May 10, 2019, 4 pages.

* cited by examiner

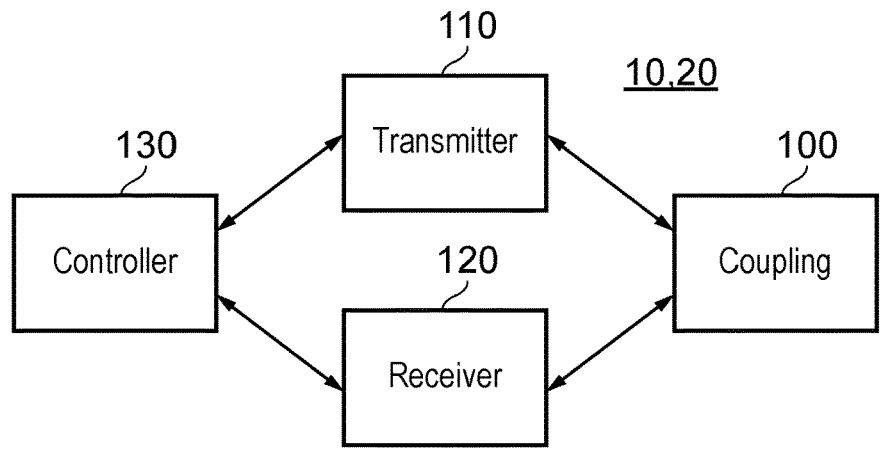
FIG. 5
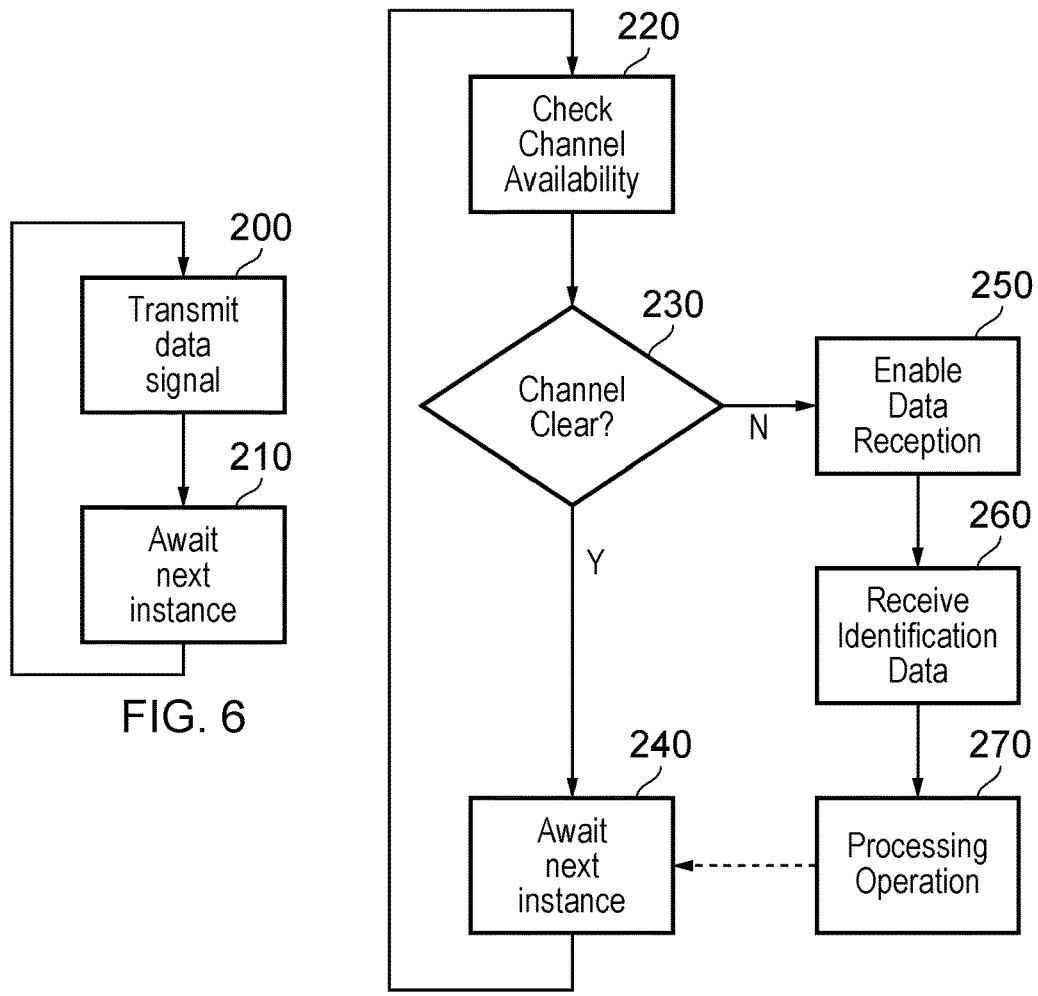
FIG. 6
FIG. 7

COMMUNICATIONS DEVICE AND METHOD

This application is the U.S. national phase of International Application No. PCT/GB2016/051056 filed Apr. 15, 2016, which designated the U.S. and claims priority to GB Patent Application No. 1509470.9 filed Jun. 2, 2015, the entire contents of each of which are hereby incorporated by reference.

BACKGROUND

This disclosure relates to communications devices and methods.

So-called near-field communications systems, as an example of communications arrangements suitable for propagation via a communications path including at least a part of a human or animal body, do not generally have an antenna of sufficient length to produce an electromagnetic field. They are capable of generating either an electric or magnetic field, but not both and, therefore, the field strength drops off very quickly with distance and there is substantially no free-space propagation.

Because near-field systems do not generate propagating electro-magnetic (EM) fields, near-field systems offer some distinct features that are hard to achieve with traditional radio communications, including privacy, security, location-specific operation (in that a device communicating via this route normally has to be close to the other communicating device, so that at least a relative location can be inferred), low power requirements and implementation simplicity.

Body-coupled communications (BCC), also known as human body communications (HBC), can make use of a near-field system, whereby an electric field propagates over the surface of the human or animal body from one node (transmitter, receiver or both) to another node. BCC offers an additional advantage by allowing the user to signal intent through actions, such as by physically touching an IoT device (Internet of Things, a term used here to refer to a device with embedded electronics to allow it to communicate digitally with another device or server) or another non-networked device (such as a door lock) with which the user would like to interact.

SUMMARY

In an example arrangement there is provided a device comprising:

a coupling configured to couple signals to and from a communications path including at least a part of a human or animal body;

a data transmitter coupled to the coupling and configured to transmit, from time to time, a data signal of at least a predetermined temporal duration via the communications path; and a data receiver coupled to the coupling and configured to detect the presence of a signal on the communications path at sets of one or more successive detection instances disposed between successive transmissions of the data signal by the data transmitter, the data receiver being configured so that the successive detection instances of a set are temporally separated by no more than the predetermined temporal duration;

the device being configured to initiate a processing operation in response to a detection by the data receiver of the presence of a signal on the communications path.

In another example arrangement there is provided a device comprising:

a coupling configured to couple signals to and from a communications path including at least a part of a human or animal body;

a data transmitter coupled to the coupling and configured to transmit, from time to time, a data signal of at least a predetermined temporal duration via the communications path; and a data receiver coupled to the coupling and configured to detect the presence of a signal on the communications path at sets of one or more successive detection instances disposed between successive transmissions of the data signal by the data transmitter, the data receiver being configured so that the successive detection instances of a set are temporally separated by no more than the predetermined temporal duration;

the device being configured to initiate a processing operation in response to a detection by the data receiver of the presence of a signal on the communications path.

In another example arrangement there is provided a method comprising:

coupling signals to and from a communications path including at least a part of a human or animal body;

transmitting, from time to time, a data signal of at least a predetermined temporal duration via the communications path;

detecting the presence of a signal on the communications path at sets of one or more successive detection instances disposed between successive transmissions of the data signal, such that the successive detection instances of a set are temporally separated by no more than the predetermined temporal duration;

initiating a processing operation in response to a detection of the presence of a signal on the communications path.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIG. 5 schematically illustrates a body communications device;

FIGS. 6 and 7 are schematic flow charts illustrating operations of the device of FIG. 5;

Figure 1:
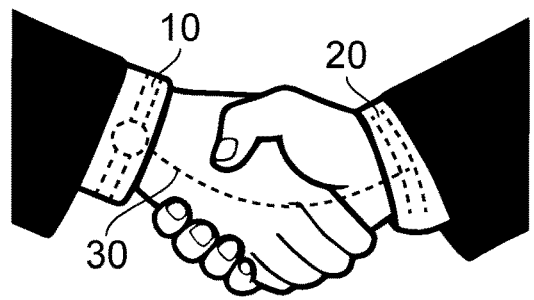
FIG. 1 schematically illustrates a pair of users each wearing a wearable device.

Before discussing the embodiments with reference to the accompanying figures, the following description of embodiments is provided.

An example embodiment provides a device comprising:

a coupling configured to couple signals to and from a communications path including at least a part of a human or animal body;

a data transmitter coupled to the coupling and configured to transmit, from time to time, a data signal of at least a predetermined temporal duration via the communications path; and a data receiver coupled to the coupling and configured to detect the presence of a signal on the communications path at sets of one or more successive detection instances disposed between successive transmissions of the data signal by the data transmitter, the data receiver being configured so that the successive detection instances of a set are temporally separated by no more than the predetermined temporal duration;

the device being configured to initiate a processing operation in response to a detection by the data receiver of the presence of a signal on the communications path.

As discussed above, some applications seek energy-efficient wireless communications. For example, RF personal area radios achieve high energy-efficiency for wireless data transfer. However, before exchanging data, two such devices may first aim to discover one other. Two desirable features for device discovery are a low always-on power consumption, detection latency below the human perception limit of about 150 milliseconds (ms), and a way of selecting the intended device to interact with.

Example embodiments of the present disclosure provide a transmission and reception system which, by virtue of the respective timings, provides a potentially rapid detection of one device by another, and, by virtue of a potentially low duty cycle of operation, provides a potentially low power consumption.

In example embodiments the data transmitter and the data receiver are configured to operate in a half-duplex mode so that the data transmitter and the data receiver are configured to operate during respective complementary time periods.

In example embodiments the data signal comprises information identifying the device; and the data receiver is configured, as the processing operation, to receive a data signal from another device comprising information identifying that other device. This allows a data exchange to take place in response to the detection of another device on the communications path.

In example embodiments the data receiver is configured, as the processing operation, to receive data from the communications path during an interval of at least the predetermined temporal duration.

In example embodiments the device comprises a controller configured to control an interval between successive transmissions of the data signal. In order to reduce the chance of accidental temporal clashes between transmissions by different asynchronous devices, the controller may be configured to set the intervals between successive transmissions of the data signal according to a pseudorandom distribution of intervals.

In order to conserve either or both of available power or stored energy (for example in a battery source) the controller may be responsive to one or more parameters of power supply to the device so as to vary the interval between successive transmissions of the data signal in response to a change in one or both of:

a remaining quantity of stored energy available for power supply to the device; and the electrical power deliverable by a power supply to the device.

The relationship between the various timings can mean that a detection by the receiver will always detect the presence of another transmitter, for example when each transmitted instance of the data signal has a temporal length of at least twice the predetermined temporal duration; and successive detection instances in a set are temporally separated by the predetermined temporal duration. In example arrangements it can be guaranteed (from the point of view of timing) that the whole of the predetermined duration of data transmission will be available for reception, where each transmitted instance of the data signal has a temporal length of at least twice the predetermined temporal duration plus the length of an operation by the receiver to detect the presence of a signal on the communications path; and the data signal comprises data repeated on a cyclic basis with a repetition period no longer than the predetermined temporal duration.

Example embodiments provide a technique which can avoid clashes of transmissions between two devices but also provide a prompt detection of each device by the other, by providing a device in which the data transmitter is configured to initiate transmission of the data signal in response to a first detection by the data receiver that the communications path is clear of other signals, after a detection by the data receiver of a signal on the communications path.

Various types of processing action can take place when another device is detected. For example, the processing operation may comprise one or more selected from the list consisting of:

an exchange of identification data between the device and another device coupled to the communications path;

an exchange of secure encryption key information between the device and another device coupled to the communications path;

an initiation of a wireless telecommunications channel for communication, not via the communications path, between the device and another device coupled to the communications path; and generation and transmission of an instruction to initiate a mode of operation of another processing device.

In example embodiments the coupling is a capacitive coupling; and the signals are radio-frequency (RF) signals (noting that the term "radio-frequency" relates to a frequency parameter of the signals rather than implying any particular type of propagation such as propagation by electromagnetic waves).

As part of a possible detection of inadvertent and/or malicious contacts, the device may comprise a detector configured to detect, from a signal received by the data receiver, one or more parameters of the communications path, the device being configured to select the processing operation according to the detected one or more parameters.

For example, when the path parameters do not substantially match those expected, a data exchange operation might be inhibited.

Example embodiments may include an approach detector configured to detect approach of a body towards the device, the device being configured to change a mode of operation in response to a detection by the approach detector. For example, such a detection could cause the device to transition from a mode in which part or all of the communications operations discussed above are not carried out, or are carried out but less frequently than in a normal mode of operation, to a normal mode of operation in which the operations are indeed carried out, and/or could cause the device to bring forward a communications operation without changing the ongoing repetition rate of such operations.

Example embodiments may be implemented as a telecommunications system comprising two or more such devices.

Example embodiments may be implemented as wearable data processing apparatus comprising a device as defined above, the coupling being disposed so that, in use, the communications path includes at least a part of the body of a wearer of the wearable data processing apparatus.

FIG. 1 schematically illustrates a pair of users (only one forearm of each user being shown for clarity of the diagram) each wearing a wearable device making use of body-coupled communication techniques. In the example shown in FIG. 1 the users are wearing wrist-mounted devices 10, 20 on their respective right wrists, the devices being (for example) in the form of a watch. Each device 10, 20 is coupled to the respective user's body (at the wrist in this example) and so the respective user's body forms a communications path for that device.

When the users' hands make contact, for example in a handshake as shown schematically in FIG. 1, a communications path 30 is formed for body-coupled communication between the BCC device 10 and the BCC device 20. Note that the path 30 is shown in schematic form as following a particular route between the devices 10, 20 but it will be appreciated that in fact the communications path 30 between the two devices can encompass any parts of the two users' skin or other body tissue, particularly the skin on the users' right wrists and hands.

Note therefore that when the device is worn by one user, isolated from another user, that user's body represents a communications path for that device. When the two users make physical contact (for example in a physical handshake) the two users' bodies form a communications path for the devices. In alternative embodiments, a user wears a device and the other device is provided on an inanimate object. In such cases, when the user touches the object a communications path can be formed including at least a part of the body of the device-wearing user.

An example use of the arrangement of FIG. 1 is in the exchange of personal contact details. For example, at a business or networking event, a physical handshake could take the place of an exchange of business cards, in that a BCC communications path temporarily formed during the physical handshake can be used by the devices 10, 20 to exchange digital data indicating contact details of the two handshaking users, for storage at the other user's device.

Figure 2:
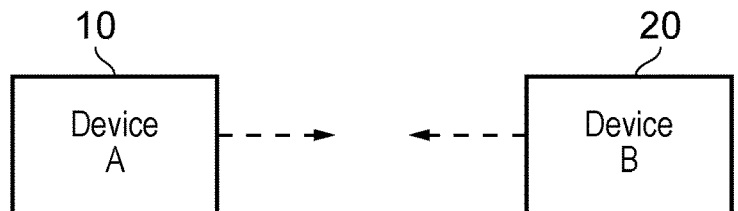
FIGS. 2 and 3 schematically illustrate a user handshake process.
Figure 3:
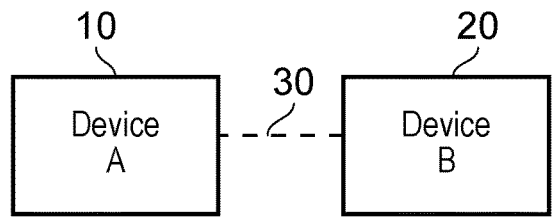

FIGS. 2 and 3 schematically illustrate the process described above, in that before the physical handshake takes place, each of the two BCC devices 10, 20 is coupled to its respective user's body (for example, at the wrist) as a communications path for BCC communications, but there is no BCC communications path between the two devices.

In FIG. 3, the physical handshake is taking place and the BCC path 30 is (at least temporarily) established.

Figure 4:
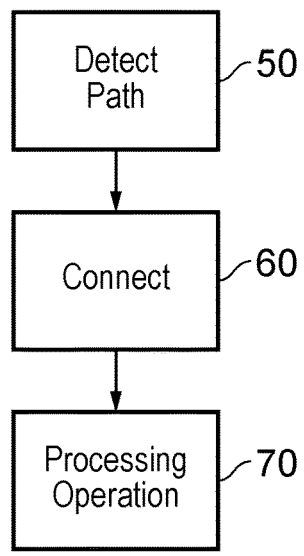
FIG. 4 is a schematic flow chart illustrating a user handshake process.

FIG. 4 is a schematic flow chart illustrating the basic process discussed above, and can relate to operations carried out by either or both of the devices 10, 20.

At a step 50, at least one of the devices 10, 20 detects that a communications path 30 exists between that device and another BCC device, and that the other BCC device is present and active on the communications path. At a step 60, one or both of the devices 10 initiates the forming of a data connection between the two devices 10, 20 via the communications path 30. At a step 70, one or both of the devices 10, 20 carries out a processing operation. In the example discussed above, the processing operation could encompass exchanging encryption key data and/or exchanging user contact data with the other device. But it will be appreciated that (as discussed further below) various other processing operations may be carried out.

FIG. 5 schematically illustrates a BCC device such as either of the devices 10, 20. The device of FIG. 5 comprises (potentially in addition to other components, not shown) a coupling 100 configured to couple signals to and/or from a human or animal body. As an example, in the case of a device configured in the form of a watch or bracelet, the coupling could be formed by at least a part of an interior surface of the watch or bracelet when worn, such as the inside surface of at least part of a strap and/or the surface of the rear casing of the watch, which is to say that part of the watch casing which (in normal use) abuts the skin. In examples to be discussed below, the coupling is a capacitive coupling formed by a conductive (such as a metal) electrode which is prevented from making direct (conductive) electrical contact with the user's skin by a covering dielectric layer such as a thin plastics layer (for example, between 10 and 1000 µm thick, though other values may be used) between the metal electrode and the user's skin. Therefore, in examples, the coupling is a capacitive coupling; and the signals are radio-frequency signals. In other examples, the coupling could be formed by, for example, a conductive door knob or a conductive casing (or part of a casing) of an electronic device, which for example might be covered by a dielectric film.

A transmitter 110 and a receiver 120 are connected to (coupled to) the coupling 100. The example device of FIG. 5 operates in a so-called half-duplex mode so that the transmitter 110 and the receiver 120 are configured to operate during respective complementary time periods. Half-duplex operation allows bidirectional communication by a single device, but does not provide for transmission and reception of data at the same time. So, although both the transmitter 110 and the receiver 120 are connected to the coupling 100, only one of the two (that is to say either the transmitter 110 or the receiver 120) can be in active operation handling signals via the coupling 100 at any time. There may be periods when neither is operating. Note that during periods (in the half-duplex mode) in which either the transmitter or the receiver is not in active operation, there is no requirement that the transmitter or receiver be completely inactive and powered down, just that the transmitter or receiver (as the case may be) is not actively transmitting or receiving via the coupling 100.

Note that although a single coupling 100, shared between the transmitter 110 and the receiver 120, is schematically illustrated in FIG. 5, in other example embodiments the transmitter 110 and the receiver 120 could be associated with separate respective couplings. Or there could be multiple couplings (for example to different parts of the user's body, such as different positions around the wrist) which could be shared between the transmitter 110 and the receiver 120, or individually associated with either the transmitter or receiver.

A controller 130 carries out various functions to control operations of the transmitter 110 and the receiver 120.

FIG. 5 therefore provides an example of a device comprising a coupling (such as the coupling 100) configured to couple signals to and from a communications path including at least a part of a human or animal body; a data transmitter (such as the transmitter 110) coupled to the coupling and configured to transmit, from time to time, a data signal of at least a predetermined temporal duration via the communications path; and a data receiver (such as the receiver 120) coupled to the coupling and configured to detect the presence of a signal on the communications path at sets of one or more successive detection instances disposed between successive transmissions of the data signal by the data transmitter, the data receiver being configured so that the successive detection instances of a set are temporally separated by no more than the predetermined temporal duration; the device being configured to initiate a processing operation in response to a detection by the data receiver of the presence of a signal on the communications path.

Examples of operations of the device of FIG. 5 will now be discussed. In connection with FIGS. 6-8, operations to detect the presence of another BCC device connected to the device via a telecommunications link or path including at least part of a human or animal body will be described.

At a basic level, in the operation of the device of FIG. 5, the transmitter 110 and the receiver 120 are placed into active operation intermittently according to a duty-cycle or pattern of operations which is established so as to allow one such device to detect the presence, on a telecommunications link or path, of another such device.

The transmitter 110 is configured (for example, under the control of the controller 130) to transmit, from time to time, a data signal of at least a predetermined temporal duration via the human or animal body to which it is coupled. FIG. 6 is a flow chart schematically illustrating this operation, in which, at a step 200, the transmitter 110 transmits the data signal of at least a predetermined temporal duration and, at a step 210, the transmitter 110 waits, in a non-transmitting mode, for the next instance at which the controller 130 controls the transmitter 110 to transmit the data signal.

The data signal may include identification data identifying the particular device which is transmitting that data. It can either be transmitted as a temporarily long data signal or can be repeated multiple times during the transmission period of at least the predetermined temporal duration. Examples of the data signal will be discussed below with reference to FIG. 8. The receiver may be configured, as the processing operation, to receive a data signal from another device comprising information identifying that other device.

The receiver 120 operates intermittently, in between transmissions by the transmitter 110 of the data signal. An aim of the receiver 120 in this respect is to detect the presence, on the communications path, of the transmitter 110 of another device. FIG. 7 is a schematic flow chart illustrating these operations.

At a step 220, the receiver 120 performs a check (referred to here as a "channel check assessment" (CCA) operation) to detect whether the BCC channel is available. As discussed above, by definition, this check is carried out when the transmitter 110 of the same device is not transmitting (because the device operates in a half-duplex mode), and so the check carried out at the step 220 relates to a detection of whether another device coupled to the same communications path is currently making a transmission.

At a step 230, when the channel is detected to be clear (indicating that no transmissions are detected, which is to say the presence of another transmitting device has not been detected at this time) then control passes to a step 240 at which the receiver 120 ceases its active receiving operation and waits for the next instance at which the step 220 is to be carried out (as controlled by the controller 130).

If, however, at the step 230 the channel is detected not to be clear, then various actions can be initiated by the controller 130. Purely as an example, the controller 130 can enable data reception for a particular period at a step 250 to allow (at a step 260) identification data being transmitted as the data signal by the other device to be received. Whether or not the steps 250, 260 are carried out, a processing operation can be initiated at a step 270, before control returns to the step 240 to await a next instance of operation of the step 220. Note that it may be that the processing operation 270 takes a considerable length of time such that there may be a delay before the step 270 returns control to the step 240. Accordingly, the processing operation may be considered to be either or both of the steps 250, 260, plus or minus the step 270. The data receiver may therefore be configured, as the processing operation, to receive data from the communications path during an interval of at least the predetermined temporal duration.

Figure 8:
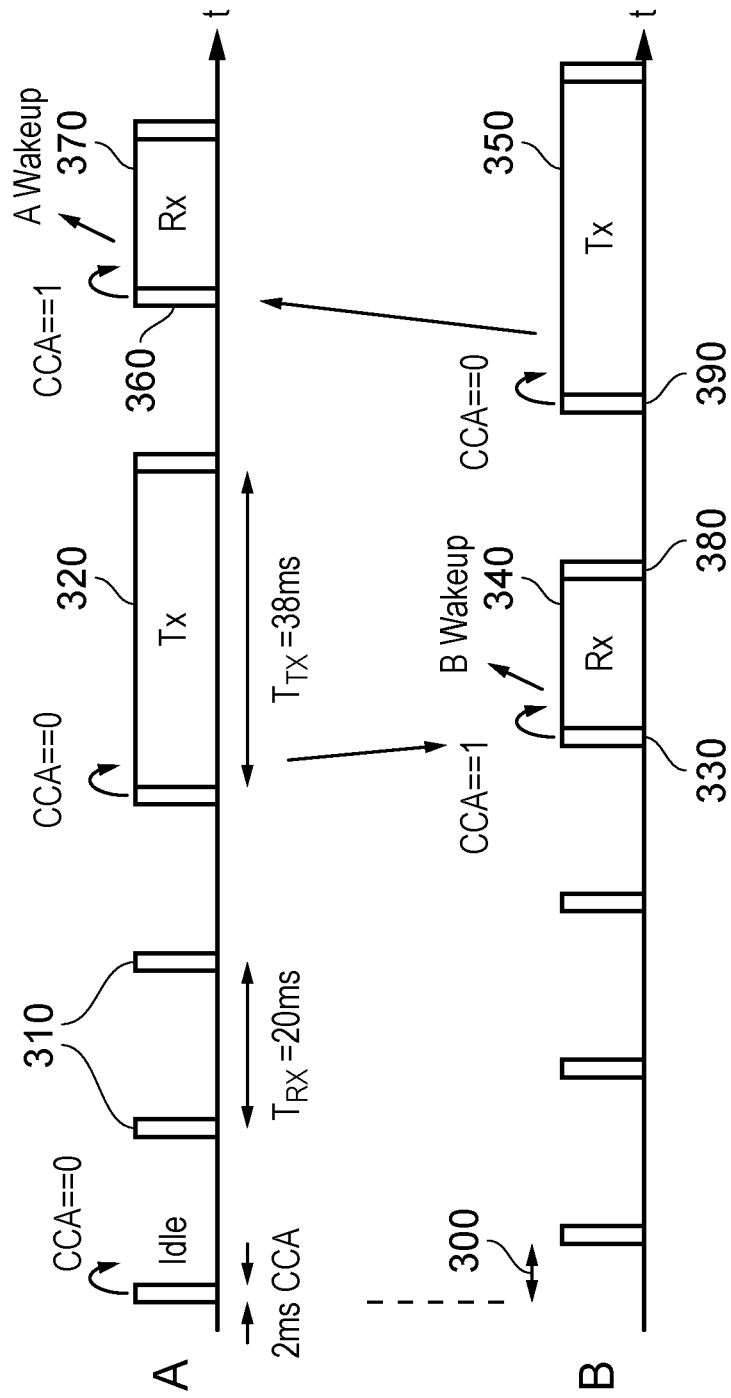
FIG. 8 is a schematic timing diagram.

FIG. 8 is a schematic timing diagram illustrating the operations discussed with reference to FIGS. 6 and 7.

In FIG. 8, time (t) is shown running from left to right. An upper portion of FIG. 8 represents operations by one of a pair of devices, which will be referred to as device A, and a lower portion of FIG. 8 schematically represents operations by another of a pair of devices, to be referred to as a device B. As indicated by a schematic arrow 300 representing an example of a phase difference between operations of the devices A and B, the devices A and B are asynchronous with respect to one another. This asynchronous operation is an expected situation, since an example purpose of the present arrangement is to allow a first detection of the presence of another device on a communications path where that other device was entirely independent before the detection took place. So, the devices A and B are considered to be entirely independent devices until the time at which their common connection to a communications path is established.

The operations corresponding to the step 220 of FIG. 7 are indicated by periodic blocks 310 each of which represents a CCA operation during which the receiver 120 simply detects whether there is a transmission on the same carrier frequency. The notation of FIG. 8 is that the text "CCA=0" represents the outcome that the channel was detected at the step 230 to be clear. The text "CCA=1" represents the other path at the step 230, namely a detection that the chancel was occupied by a transmission by another device. In the example of FIG. 8, the CCA operations last for 2 milliseconds (ms).

The CCA operations 310 are illustrated as being periodic with a repetition period of 20 ms. A regular periodicity is not a requirement, however, and alternatives will be discussed below. The CCA operations 310 take place every 20 ms except during a period 320 during which the data signal is transmitted, corresponding to the step 200 of FIG. 6. This provides an example of the data receiver 120, coupled to the coupling, detecting the presence of a signal on the communications path at sets of one or more successive detection instances disposed between successive transmissions of the data signal by the data transmitter 110. In this example, a set of successive detection instances comprises a set of instances at 20 ms intervals between the periods 320 at which the transmitter is transmitting.

In the example of FIG. 8, the period 320 lasts 38 ms, being the gap between a CCA check and a next-but-one CCA check in the periodic sequence. So during the period 320, one CCA check, which would otherwise have taken place according to the periodic sequence, is omitted.

Each of the devices A and B carries out CCA checks at substantially the same period of 20 ms. However, as noted above, the cycle of the CCA checks is asynchronous as between the device A and the device B.

With regard to the device B, a first three CCA operations in the example sequence of FIG. 8 detect that the channel is clear and so (referring to FIG. 7) control simply returns to the step 240 to await the next CCA check.

However, at a fourth CCA operation 330 as drawn, the transmission by the device A during the period 320 is detected. This leads to a detection result (at the device B) of CCA==1. In turn this causes control to be passed to the step 250 in FIG. 7 leading to the enablement of data reception by the receiver 120 during a period 340. In FIG. 8 this is also referred to as a "wakeup" operation at the device B (corresponding to an example of the processing operation 270). Here, the term "wakeup" refers to an example operation in which the device of FIG. 5 provides a signal to a processing element or other element to indicate that (a) another communicating device has been detected, and (b) the processing or other element should therefore transition from a low-power or zero-power quiescent state to a higher-power active state in readiness for handling data communications with the other device or other activities. So, the detection arrangements and the provision of the "wakeup" signal described here can provide or enable (at least in example embodiments) a net power saving for associated processing or other elements, by allowing those other elements to adopt a quiescent power-saving state when a communicating device is not detected.

During the reception period 340, identification data contained in the transmission period 320 of the data signal by the device A is received by the device B.

Subsequently, a transmission by the device B during a period 350 is detected by a CCA operation 360 at the device A, leading to reception during a period 370 by the device A (of the identification data being transmitted by the device B) and also a wakeup operation at the device A.

So, by the end of the interaction represented by the timing diagram shown in FIG. 8, both devices have detected the presence of the other respective device on the communications path, and both devices have received identification information from the other device.

In embodiments, the times at which the transmissions take place may be selected (by the controller 130) pseudo-randomly (according to a pseudo-random distribution of intervals). This can tend to reduce the chance of two transmissions clashing (noting that CCA checks cannot take place during transmission by the same device because the devices operate only in a half-duplex mode) by reducing the likelihood that both of the devices A and B happen to transmit at the same time.

However, in the case of the transmission period 350 (a transmission by the device B, which in this example is the device to have first made a detection of another device on the communications path), various possibilities are available.

In one example, the transmission at the period 350 can simply be the next normal transmission by the device B according to the pseudo-random sequence associated with the device B.

In another example, however, the controller 130 of the device B can operate as follows. First, the controller 130 of the device B initiates a regular CCA check 380 at the end of the reception period 340. According to the timing diagram of FIG. 8, this will return a value of CCA==1 indicating that the channel is still occupied, but because the reception period 340 has only just terminated, the controller 130 does not react to the finding of CCA==1 to initiate another reception period immediately following the CCA operation 380 (although, in other embodiments, it could do so). However, the controller does defer the transmission period 350 (if it had become due according to the normal sequence of transmissions by the device B) on the basis that the channel is currently occupied. A subsequent CCA check 390 by the device B returns the value CCA==0 indicating that the channel is now clear. This represents the first CCA check after the reception period 340 at which the channel is now clear. So, the controller 130 of the device B can initiate the transmission period 350 by the device B for the prompt return of identification data to the device A.

Therefore, the avoidance of clashes between transmission periods and the prompt interchange of identification data can be assisted by the summary steps of:

(a) A CCA result of CCA==1 causes the controller 130 of that device not to allow a transmission period to take place until after a subsequent CCA check has been performed; and (b) After a reception period, at the first instance of a CCA check which indicates that the channel is now clear, (CCA==0) the controller 130 initiates the transmission period 350.

These ((a) and (b)) provide an example of an arrangement in which the data transmitter is configured to initiate transmission of the data signal in response to a first detection by the data receiver that the communications path is clear of other signals, after a detection by the data receiver of a signal on the communications path.

Optionally, as discussed above, a third feature may be that:

(c) The controller 130 operates such that a CCA check (such as the CCA check 380) immediately following a reception period (such as the period 340) does not in fact trigger a further reception period even when the result is still CCA==1.

In embodiments, the repetition frequency of the transmission and/or reception periods may be reduced (potentially to zero) in a power saving mode, under the control of the controller 130. Example arrangements using this technique will be discussed below. In the case of a random or pseudo-random distribution of intervals, a parameter relating to an average repetition frequency can be varied in this way.

Aspects of the timing of individual operations shown in FIG. 8 will now be discussed. The data transmitter (such as the transmitter 110) coupled to the coupling is configured to transmit, from time to time, a data signal of at least a predetermined temporal duration via the communications path. The predetermined temporal duration is, in this example, 18 ms, being the time period between temporally adjacent CCA checks 310. (The CCA checks last, in this example, 2 ms and occur every 20 ms). Accordingly, in this example, the data receiver is configured so that the successive detection instances (CCA checks in this example) of a set are temporally separated by no more than the predetermined temporal duration of 18 ms which, as mentioned above, is the time period from the end of one CCA check to the start of a next CCA check during a set of instances disposed between two transmission periods by that device.

However, in example embodiments, the transmission period 320, 350 is longer than the predetermined temporal duration of 18 ms. In fact, for example, each transmitted instance of the data signal has a temporal length of at least twice the predetermined temporal duration (38 ms in this example). This relationship between the gap between successive CCA checks and the length of the transmission period means that whatever the temporal relationship (the asynchronous separation 300) between the devices A and B:

(i) CCA checks by the device B will always encompass a suitable time to detect the transmission by the device A; and (ii) a reception period 340 at the device B will always be able to receive transmitted data by the device A for the whole of the reception period 340.

(By virtue of the symmetrical operations, the same clearly applies for detection and reception by the device A of transmissions by the device B).

A reason for feature (i) is that the transmission period of 38 ms is longer than the CCA repetition period of 20 ms. So, there will always be a time at which a CCA check by one device will occur during a transmission period by another device.

A reason for feature (ii) is that (referring to the example shown in FIG. 8) the latest stage during the device A transmission period 320 that a CCA check 330 by the device B could make a first detection of the device A transmission is a CCA check starting 18 ms after the start of the transmission period 320. If the CCA check were any later, then a preceding CCA check would have detected the transmission. The CCA check 330 takes 2 ms, therefore lasting until no later than 20 ms into the transmission period 320. This still therefore leaves at least 18 ms of the transmission period 320, which corresponds to the whole length of the reception period 340.

In order to make technical use of the feature (ii), in example embodiments the data signal transmitted by each device includes identification or other data relating to that device, which is repeated in a cyclic or other manner during the transmission period in such a manner that any 18 ms portion of the data signal will encompass at least one instances of the whole of the identification or other data.

Although the CCA checks are shown in FIG. 8 are illustrated as taking place periodically, with a 20 ms repetition period within a set of such instances, a periodic arrangement is not a requirement. In embodiments, the features (i) and (ii) can be achieved by a repetition of the CCA checks such that the successive detection instances of a set are temporally separated by no more than the predetermined temporal duration (of 18 ms in this example). Accordingly, a variable separation could be used.

It will also be appreciated that the example figures of 2 ms, 18 ms, 38 ms and so on are merely examples for the purposes of the present description, Other parameters and timings could be used.

The timing of FIG. 8 therefore provides an example of a situation in which each transmitted instance of the data signal has a temporal length (for example, 38 ms) of at least twice the predetermined temporal duration (twice 18 ms); and successive detection instances in a set are temporally separated by the predetermined temporal duration (for example, a gap of 18 ms from the end of one CCA check to the start of the next CCA check). For example, each transmitted instance of the data signal has a temporal length (for example, 38 ms) of at least twice the predetermined temporal duration (twice 18 ms) plus the length (2 ms) of an operation by the receiver to detect the presence of a signal on the communications path, and the data signal comprises data repeated on a cyclic basis with a repetition period no longer than the predetermined temporal duration of 18 ms.

The time interval (or, in the case of a pseudo-random distribution of intervals, an average or minimum time interval) between transmissions can be varied in order to conserve electrical power or stored energy in a battery system. For example, the controller 130 may be responsive to one or more parameters of power supply to the device so as to vary the interval between successive transmissions of the data signal in response to a change in one or both of: a remaining quantity of stored energy available for power supply to the device; and the electrical power deliverable by a power supply to the device. In the case of stored energy, as a remaining battery capacity (amount of stored energy remaining) becomes lower, the time interval between transmissions could increase. In the case of a power supply constraint, for example when a system is operating under solar power, or radio frequency induced power, the interval between transmissions could increase in instances where the available power is lower.

Figure 9:
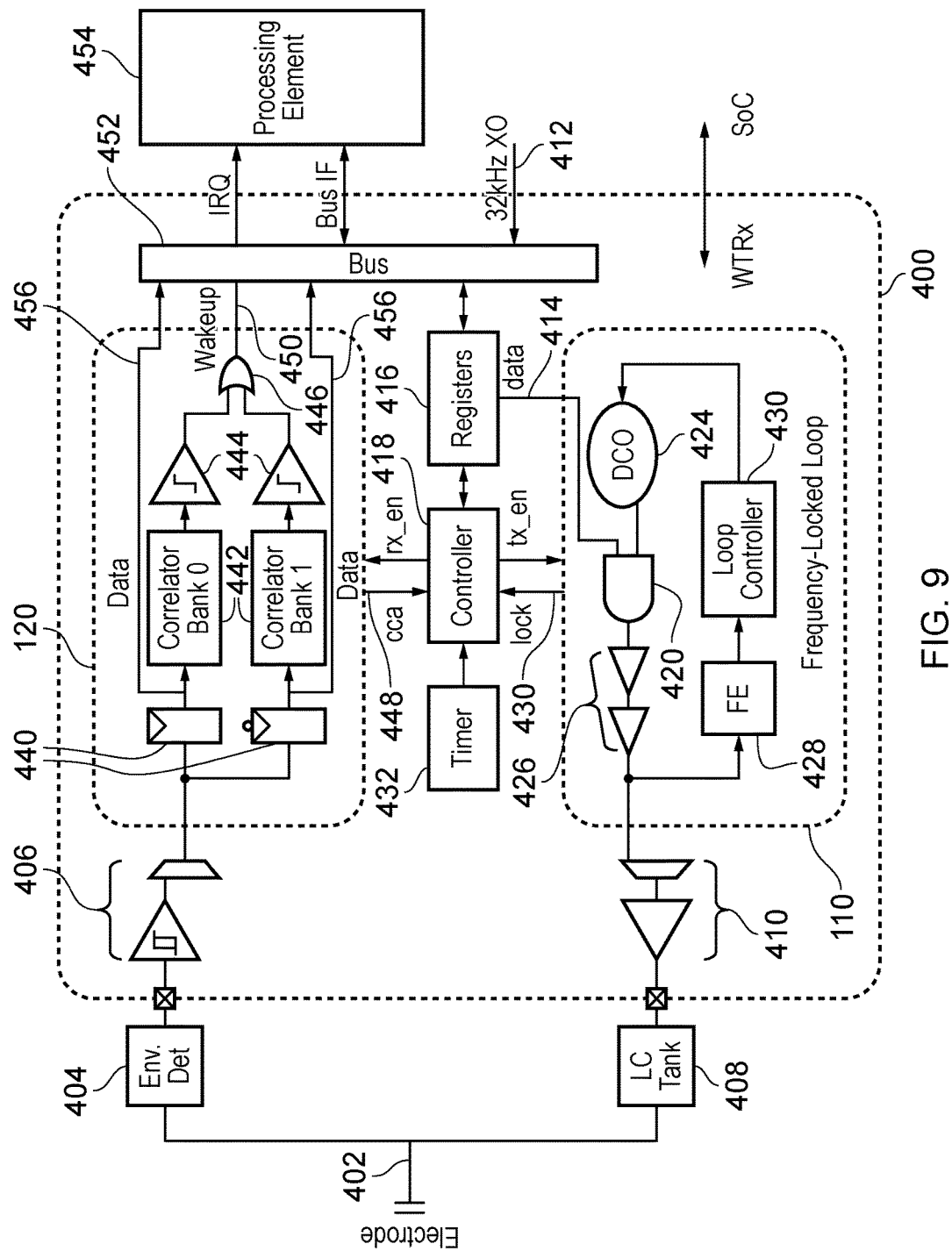
FIG. 9 schematically illustrates the device of FIG. 5 in more detail.

FIG. 9 schematically illustrates the device of FIG. 5 in more detail. A body-coupled communication (BCC) wakeup transceiver (WTRx) 400 encompasses the functions of the transmitter 110, the receiver 120 and the controller 130. An insulated electrode (for example a metal electrode covered with a dielectric layer) 402 provides the function of the coupling 100 of FIG. 5. The electrode is connected or coupled via an envelope detector 404 and a digital input/output interface 406 to the receiver 120, and via an LC tank circuit 408 and a digital input/output interface 410 to the transmitter 110.

Signalling of data is provided by so-called on-off keying (OOK) in which a carrier signal at a carrier frequency, for example a 10 MHz carrier signal, is switched on and off according to each data bit or symbol to be transmitted. The data or symbol rate is much lower than the frequency of the carrier signal. In the present example, a symbol rate of 4 kHz is used, with a symbol clock being derived from an externally-provided clock signal 412 such as a 32 kHz clock signal provided by an external crystal oscillator (where "external" simply implies external to the WTRx system).

In the context of such an OOK system, the LC tank circuit 408 provides a resonant circuit to generate sufficient signal swing at the electrode 402 for communication with a corresponding device acting (at that point in time) as a receiver. This allows the receiver side of the circuit to use a passive envelope detector 404 without requiring front-end amplification of the signal detected in a receiving mode by the electrode 402. The LC tank circuit 408 is arranged, in example embodiments, to provide a passive voltage gain of 6 dB when loaded.

Data transmission by the OOK technique is handled by the transmitter 110 which receives a data signal 414 from one of more registers 416 under the control of a controller 418 providing functionality of the controller 130 of FIG. 5. The data signal comprises successive data items (for example, bits) which are supplied or "advertised" for modulation at a data rate, for example dependent upon the clock signal 412 or a signal derived from it. In the modulation scheme, the data rate is significantly lower than the carrier frequency used.

Data symbols (for example, bits) of the data signal 414 are combined at an AND gate 420 with the output of a digitally controlled oscillator (DCO) 424 (the DCO output representing oscillations at a carrier frequency). The use of the AND gate means that when a data bit of the data signal 414 is a logical "1", the DCO output is passed by the AND gate 420. When a data bit of the data signal 414 is a logic "0", the DCO output is not passed by the AND gate 420.

The DCO in turn forms part of a frequency-locked loop (FLL) comprising an amplifier stage 426, a feedback element (FE) 428 and a loop controller 430. The FLL provides an output (provided to the digital input/output stage 410) of an OOK-modulated 10 MHz carrier signal.

The FLL arrangement achieves a frequency lock which is indicated by a lock signal 430 to the controller 418. Transmission is not enabled by the controller 418 until lock has been achieved. After that, the FLL is not in fact used and the DCO operates in open loop operation during each burst of OOK-signalled data, so as to reduce power consumption of maintaining a fully locked loop the whole time. Note that in other embodiments a phase locked loop (PLL) arrangement could be used instead of the FLL.

The controller 418 is responsive to a timer 432 which provides timing signals relating to the 20 ms repetition period of the timing diagram of FIG. 8. In response to these timing signals, the controller provides a transmitter enable signal (tx_en) signal to the transmitter to enable operation of the transmitter during the periods 320, 350 of FIG. 8, and a receiver enable signal (rx_en) to enable operation of the receiver during the CCA checks and also during the reception periods 340, 370 of FIG. 8. The controller 418 and the timer 432 therefore provide an example of a controller configured to control an interval between successive transmissions of the data signal.

The receiver 120 operates with respect to the envelope-detected signal received from the electrode 402 and comprises a pair of latches 440 operating in a complementary fashion so that one reacts to the rising edge of the received envelope and the other to the falling edge of the received envelope. A pair of correlators 442 detect rising and falling edges consistent with received data, with the output of the correlators being passed to a pair of threshold comparators 444 which compare the correlated information with a threshold level. The thresholded comparator outputs in respect of 8 symbol periods (2 ms) are combined an OR gate 446 such that when either comparator indicates that a received signal of at least the threshold magnitude has been detected, a result of CCA==1 is detected. This result is output as a CCA signal 448 to the controller 418 and also as a wakeup signal 450, via a bus connector 452 to an external processing element 454. For example, the wakeup signal can be provided as an interrupt request (IRQ) to the external processing element 454.

As well as providing a thresholded detection for the CCA check, the receiver also provides complementary data signals 456 indicative of decoded received data. These are also provided to the bus 452 for use by the controller and/or the processing element.

In example embodiments, although the WTRx system 400 is "always on" the duty cycle of activity as between the transmitter and receiver operations of the WTRx system means that the WTRx system is idle for just over 50% of the time while operating in a detection mode as discussed above. In an example embodiment, using a supply voltage of 0.6 V and a DCO centre frequency of 10 MHz, a measured power consumption was 5 µW during reception operations and 6.5 µW during transmission operations, with a 0.5 µW leakage power in the idle state (neither transmitting nor receiving).

The duty-cycling provided by the example arrangement of FIG. 8 therefore provides an average power consumption of 3.54 µW.

FIGS. 10*a*-12 schematically illustrate example operations providing a security check to provide an assessment of whether a detected body contact is an intended contact rather than an accidental contact (such as an accidental contact which might occur while a wearer of a BCC device is standing in a busy train, for example). This is achieved by comparing electrical properties of the communications path between the two devices with expected properties associated with the normal use of such a device.

Figure 10A:
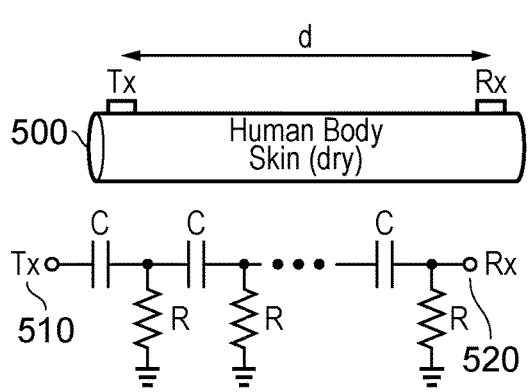
FIG. 10a schematically illustrates a model of a communications path.

FIG. 10*a* schematically illustrates a model of a communications path 500 of length d, as a succession of capacitive and resistive impedances between a transmitter node 510 and a receiver node 520.

Figure 10B:
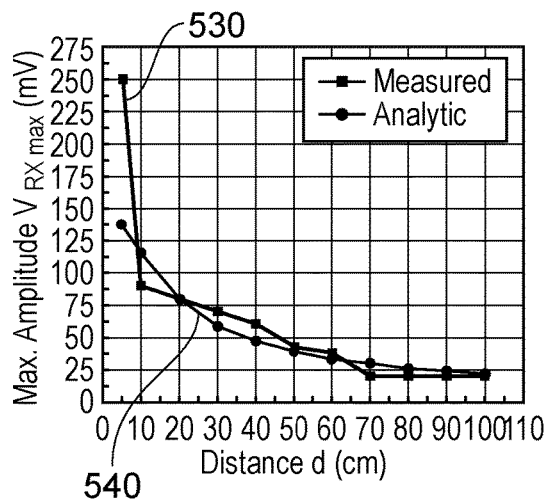
FIG. 10b schematically illustrates the amplitude of a receive signal.

FIG. 10*b* schematically illustrates the amplitude of a receive signal in millivolts (mV) against the distance d, for an example empirically measured system (a curve 530) and a model system using the model of FIG. 10*a* (a curve 540).

If the devices A and B of the discussion above are worn, for example, on the users' hand-shaking wrists, then the expected electrical separation d of the two devices when a communications path is formed (during a physical handshake) would be of the order of 40 cm. Therefore, when the signal received at either of the receivers is significantly lower than the expected signal for that order of separation distance, indicating a potentially longer distance than the expected electrical separation, an assumption may be made at that receiver that the interaction is not the currently expected type (in this example, a handshake) but may be an accidental or indeed a malicious interaction instead. For example, when a received signal strength is less than half of an expected signal strength, a potentially longer path may be assumed.

Figure 11:
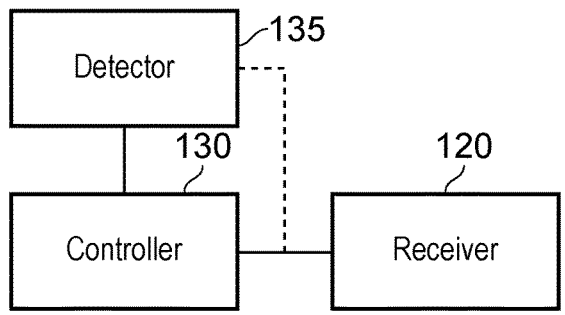
FIG. 11 schematically illustrates a part of the device of FIG. 5.

In FIG. 11, a part of the structure of FIG. 5 is shown including the receiver 120 and the controller 130, but with the addition of a detector 135 configured to detect, from a received signal received by the receiver 120, one or more parameters of the communications path. For example, the detected parameters may include a received signal strength. This provides an example of a detector configured to detect, from a signal received by the data receiver, one or more parameters of the communications path, the device being configured to select the processing operation according to the detected one or more parameters.

The analysis of the received signal strength may be based upon the assumption that the other device coupled a signal of a particular expected signal strength to the communications path. Or in some embodiments, a device can include, as part of its identification data, information indicating the transmitted signal strength by that device. In further embodiments, a device can send a request to another communicating device, for example: (a) that the other device provides at least a test signal at a particular requested or standard signal strength, and/or (b) that the other device provides data indicating the signal strength of transmissions by that other device. These interactions can be carried out under the control of the controller 130.

Figure 12:
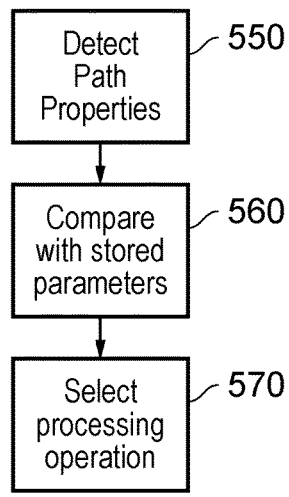
FIG. 12 is a schematic flowchart showing operations of the device of FIG. 11.

Referring to FIG. 12, which is a schematic flow chart of operations relating to this feature, at a step 550 the detector 135 detects, from a signal received by the receiver 120, one or more properties of the communications path relating to communications with a currently communicating other device. At a step 560, the detector 135 compares those path properties with one or more stored parameters such as a threshold received signal amplitude and, at a step 570, the controller selects a processing operation to be carried out in dependence upon the comparison at the step 560. So, for example, when the received signal is not consistent with the expected mode of interaction for that device (such as a signal consistent with a normal handshake) then the processing operation selected at the step 570 can be simply to ignore the other device or to send a query requesting further authentication or identification data from that other device to verify the identity of the other device, whereas when the detection at 560 indicates path parameters consistent with the expected interaction, the step 570 can select a processing operation to exchange data with that other device.

Figure 13:
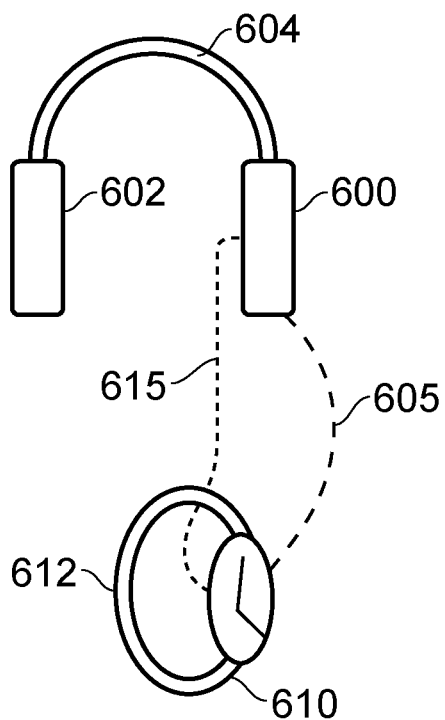
FIG. 13 schematically illustrates a pair of devices.

FIG. 13 schematically illustrates a pair of devices, where in this example one device is provided at a pair of headphones 600 and the other device is provided at a watch 610. In this example, rather than the devices being worn by separate users, it is envisaged that the devices would be worn by the same user. Here, the techniques discussed above may be used to detect the user putting on a pair of headphones such as the headphones 600, then allowing interaction between the headphones, and, for example, an audio player provided at the watch 610 to take place.

Figure 14:
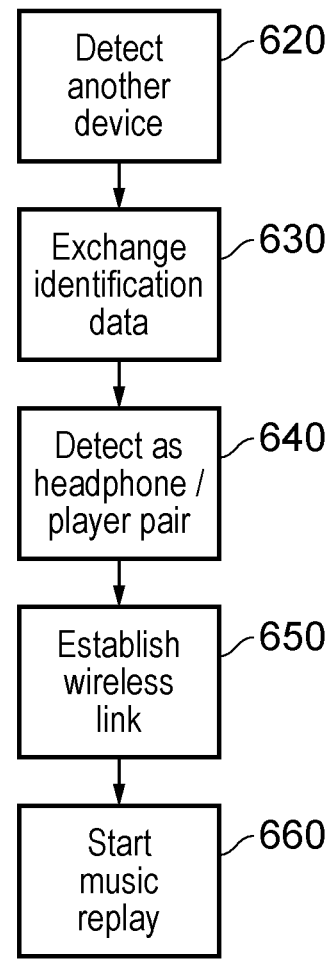
FIG. 14 is a schematic flow chart illustrating operations of the devices of FIG. 13.

FIG. 14 is a schematic flow chart illustrating these operations. At a step 620, either the watch 610 or the headphones 600 detects the other device being connected to a communications path 615 incorporating part of the body of the wearer of both devices. Note that according to the timing diagram of FIG. 8, depending on the timing of the respective transmission periods, either device could make the first detection.

Then, at a step 630, the devices exchange identification data as discussed above, which allows, at a step 640, both devices to identify that they are now part of a headphone/audio player pair worn by the same user. In response to that detection, one or both of the devices 600, 610 initiates (as a processing operation) the establishment of a wireless link 605 such as a Bluetooth® data link at a step 650. The wireless link 605 does not use the wearer's body as a transmission medium but uses free space wireless transmission and allows the transmission of audio data from the audio player at the watch 610 to the headphones 600. Then, at a step 660 music or other audio information is replayed from the audio player at the watch 610 to the headphones.

From the user's point of view, the user simply puts the headphones on and very shortly afterwards the audio player in the watch 610 starts to replay audio through the headphones. No further intervention is needed by the user.

In the example of the headphones 600, the coupling 100 could be formed as part of an inner (ear-facing) surface 602 of one or both of the ear pieces of the headphones 600, and/or as part of a strap 604 of the headphones 600. For the watch 610, the coupling could be formed as discussed above, as part of the rear casing of the watch body and/or as part of the strap 612 of the watch.

Figure 15:
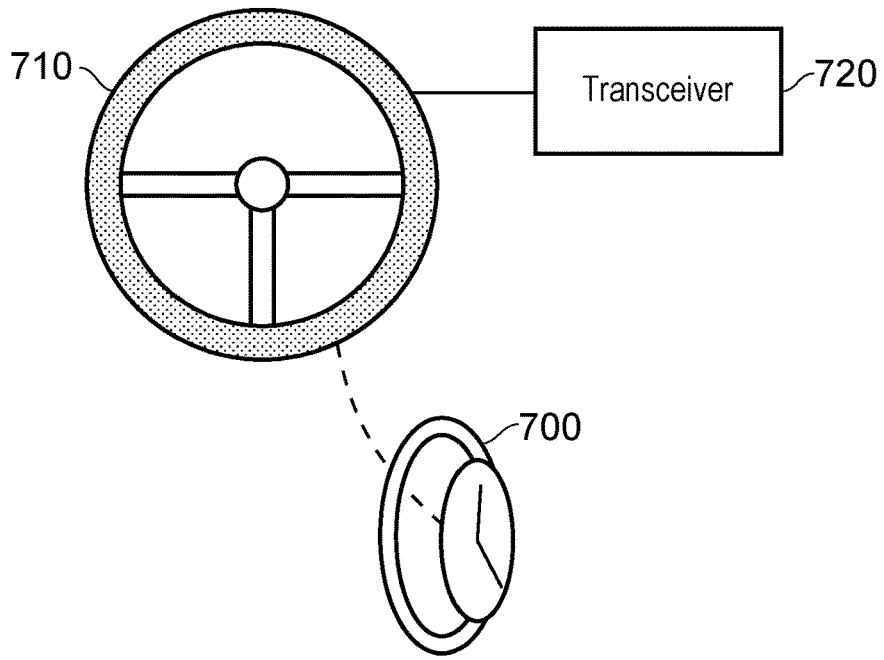
FIG. 15 schematically illustrates a user of a motor vehicle is wearing a body communications device.
Figure 16:
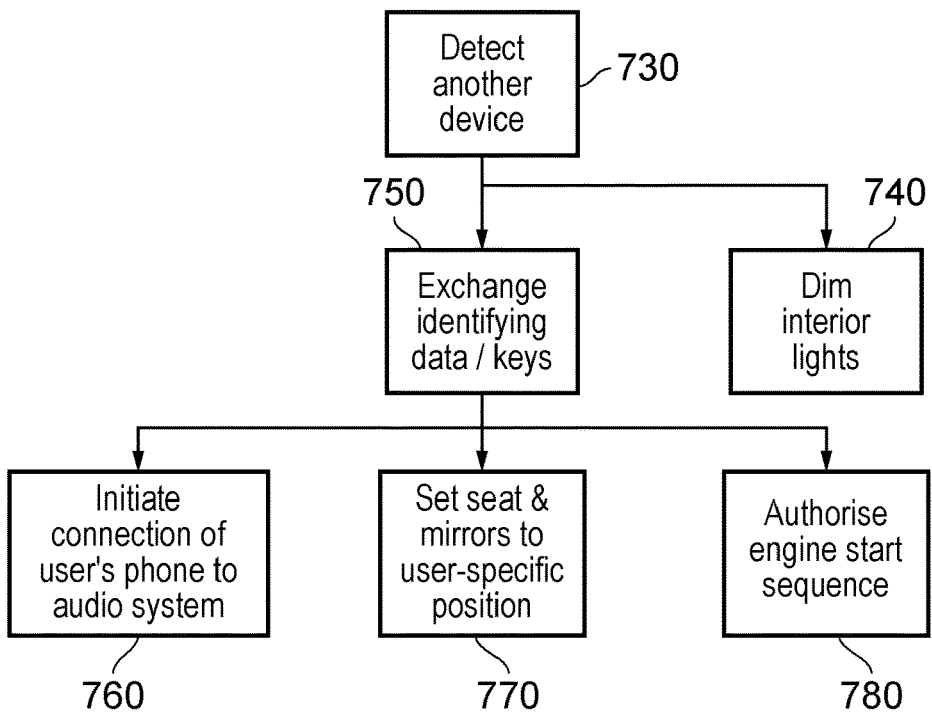
FIG. 16 is a schematic flowchart illustrating operations of the arrangement of FIG. 15.

FIG. 15 schematically illustrates an example automotive application in which a user of a motor vehicle is wearing a BCC device illustrated schematically as a watch 700. At least a part of the motor vehicle such as a steering wheel 710 incorporates a BCC device (or at least a coupling 100 of a BCC device) 720 around its rim. Using the techniques above, a detection can be made that the user wearing the device 700 has initiated contact and formed a communications path with the coupling forming part of the steering wheel 710. An example flow chart is shown as FIG. 16 illustrating various optional outcomes to this detection.

At a step 730, the BCC device 720 associated with the steering wheel 710 detects the presence of another device on a communications path formed (in this example) by the user's hands holding the steering wheel 710.

As a first example of a processing operation resulting from that detection, at a step 740, the device 720 instructs the motor vehicle to dim the interior lights of the motor vehicle on the assumption (for example) that the user is preparing to drive away. As another example, the devices 720 and 700 exchange identifying data and/or secure encryption keys at a step 750 leading to various optional outcomes such as:

(i) at a step 760, the identity of the user holding the steering wheel is established by the device 720 communicating with the device 700. The device 720 then instructs the motor vehicle's audio system to connect (for example, by a Bluetooth® wireless link) to the particular mobile phone associated with that user (possibly using the key information exchanged at the step 750).

(ii) at a step 770 the identity of the user is established by the device 720, which then instructs the motor vehicle to set the seat position and mirror orientation to pre-set positions and orientations associated with that user.

(iii) at a step 780, the identity of the user wearing the device 700 is established by the device 720 and, assuming the user is an authorised user, the device 720 in turn authorises the motor vehicle to undertake an engine start sequence.

Figure 17:
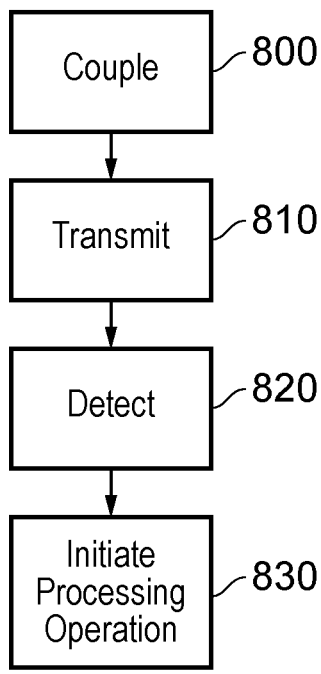
FIG. 17 is a schematic flowchart illustrating a method of operation of a device.

FIG. 17 is a schematic flowchart illustrating a method comprising the following steps:

At a step 800, coupling signals to and from a communications path including at least a part of a human or animal body.

At a step 810, transmitting, from time to time, a data signal of at least a predetermined temporal duration via the communications path.

At a step 820, detecting the presence of a signal on the communications path at sets of one or more successive detection instances disposed between successive transmissions of the data signal, such that the successive detection instances of a set are temporally separated by no more than the predetermined temporal duration.

At a step 830, initiating a processing operation in response to a detection of the presence of a signal on the communications path.

Example processing operations comprise one or more selected from the list consisting of:

an exchange of identification data between the device and another device coupled to the communications path (for example, the step 260 of FIG. 7 carried out by both communicating parties);

an exchange of secure encryption key information between the device and another device coupled to the communications path (for example, the step 750 of FIG. 16);

an initiation of a wireless telecommunications channel for communication, not via the communications path, between the device and another device coupled to the communications path (for example the step 650 of FIG. 14 or the step 760 of FIG. 16); and generation and transmission of an instruction to initiate a mode of operation of another processing device (for example, the step 660 of FIG. 14, or the steps 770 or 780 of FIG. 16, or the generation of the "wakeup" signal in FIG. 9). Other examples of such an outcome include causing a door lock to open, in response to detection of a user wearing an authorised communications device touching a door handle (reference is made to FIGS. 18 and 19 below for further possible options in respect of such an arrangement).

All or a part of the method of FIG. 17 or other methods described here may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory machine-readable data storage media by which such software and/or firmware are stored or otherwise provided (such as an optical disk, a magnetic disk, semiconductor memory or the like), are considered as embodiments of the present disclosure.

Figure 18:
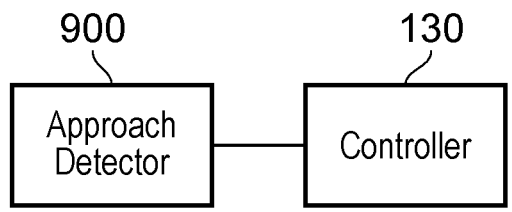
FIG. 18 schematically illustrates an approach detection arrangement.

FIG. 18 schematically illustrates an approach detection arrangement in which the controller 130 is responsive to an approach detector 900, for example forming part of a wearable device.

The approach detection arrangement could be formed as, for example, a vibration or movement detection arrangement using, for example, an accelerometer, a microphone, a rotary encoder or the like. In another example, the approach detection arrangement could be provided as a capacitance detector configured to detect a capacitance change as a human or animal body approaches and/or touches a capacitance detection probe (which may be the same as the coupling 100, or a different item). In another example, the approach detection arrangement could be provided as an optical detection arrangement, for example a passive infrared detector, or a detector such as a photoresistor which detects a change in light levels (perhaps caused by the shadow of an approaching body), or a broken-beam detector. In general the approach detection arrangement is configured to detect the approach of a human or animal body to the device, where the term "approach" can include a change in proximity so that the human or animal body is detected to be nearer to the device, and/or an actual touch of the device or an item associated with the device by the human or animal body.

In response to a detection of an approach, for example a vibration or other movement of (say) at least a threshold magnitude (a step 910 of the flowchart of FIG. 19), the radiofrequency system including parts discussed above is woken up at a step 920 from a quiescent non-operational state to an operational state (or to transition from a power-saving state, discussed below, to another state such as a non-power-saving state) so as to carry out the operations discussed above as one or more processing operations (at a step 930). This provides an example of an approach detector configured to detect approach of a body towards the device, the device being configured to change a mode of operation in response to a detection of an approach.

Figure 19:
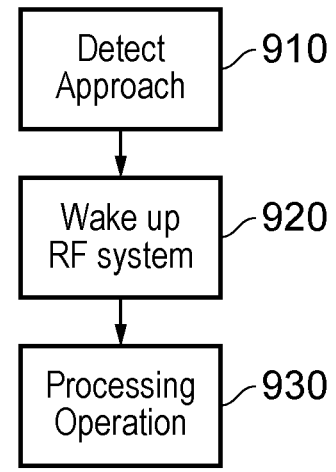
FIG. 19 is a schematic flowchart of an approach detection technique.

Note that the arrangements of FIGS. 18 and 19 could operate in one (or more) of at least several ways.

In examples, the detection at the step 910 causes the RF system to transition from not fully operating into a mode in which the RF system fully operates. In such an arrangement, in the non-full-operational state, either or both of the steps 200 and 230 are not carried out. So, for example, the RF system could be neither transmitting at the step 200 nor checking channel availability at the step 230 in the not fully operational state. Or, in another possibility, the RF system might be not transmitting at the step 200 but still maintaining the channel checking operation (230) and subsequent operations in the not-fully-operational state. In response to the detection at the step 910, the controller 130 causes the system to enter a fully operational state in which both the steps 200 and 230 (and consequent steps) are carried out. As an example, if, after a predetermined time such as five minutes after activation of the step 920, the system has not detected the presence of another node on the communications path, the system could return to the not-fully-operational state. In a variation, the detection at the step 910 could cause the device to bring forward in time an execution of the step 200 and/or the step 230 which would have happened in due course, without otherwise changing the ongoing repetition rate of those steps.

In other examples, the system could maintain the operation of the steps 200 and 230 even in a quiescent or power-saving mode, but possibly at a lower repetition frequency than in a normal operation (where the word "normal" simply refers to a mode of operation which is not a power-saving or quiescent mode of operation). A detection at the step 910 then leads to the step 920 causing the RF system to transition from such a low-repetition-frequency mode to a normal-repetition-frequency mode.

A combination of these techniques is possible, such that, for example, in a quiescent mode, the step 200 is omitted and the step 230 carried out at a lower-than-normal repetition frequency. A detection at the step 920 causes the system to transition to a mode in which both the steps 200 and 230 are carried out, and at a normal repetition frequency.

Accordingly, although the step 930 is shown in FIG. 19 as following the step 920, the step 930 may in fact be omitted such that the use made of the approach detection is to cause the RF system to transition to another mode of operation, such that a subsequent detection of another node on the communications path by the RF system causes a processing operation to be carried out as discussed earlier.

Example uses of the arrangement of FIG. 18 include detecting touch or vibrations as a user handles a door-knob, or detecting attempted rotational motion of a door knob, thus triggering an RF system associated with the door knob to initiate the processes of FIGS. 6 and 7 in respect of a communications path encompassing the door knob and at least a part of the body of the person touching the door knob (for example, if that person is wearing a wrist-mounted communications device). In response to a detection of an authorised user, or at least an authorised communications device, the processing operation could be, for example, to unlock a door lock so that the user may pass through the door.

In another example, a device which is intended to be picked up in use (or at the start of use), such as a mobile communications device, a headset, a remote commander or the like, could operate its RF systems as discussed above in a power-saving mode, to be woken up into a normal operational mode (to detect another device on a communications path) in response to an approach detection.

Note that although the examples above relate to human users, the present disclosure is also applicable to communication via the (non-human) animal body. For example, the present arrangements could be used to detect and log touch between (say) a farmer or vet and each of a herd of animals (each carrying a BCC device as discussed above) being treated, milked, inoculated or the like. Or the present arrangements could be used to detect contact between (say) an animal and a feed station. Or the present arrangements could be used to detect and log, for example, which ram sires which ewes in a field of sheep.

The present embodiments may be implemented as a telecommunications system comprising two or more devices as discussed here. The devices may be implemented as wearable data processing apparatus comprising, the coupling being disposed so that, in use, the communications path includes at least a part of the body of a wearer of the wearable data processing apparatus.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as the CPU 20) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A device comprising:
   a coupling configured to couple signals to and from a communications path including at least a part of a human or animal body;
   a data transmitter coupled to the coupling and configured to transmit, from time to time, a data signal of at least a predetermined temporal duration via the communications path; and
   a data receiver coupled to the coupling and configured to detect the presence of a signal on the communications path at sets of one or more successive detection instances disposed between successive transmissions of the data signal by the data transmitter, the data receiver being configured so that the successive detection instances of a set are temporally separated by no more than the predetermined temporal duration;
   the device being configured to initiate a processing operation in response to a detection by the data receiver of the presence of a signal on the communications path; wherein:
   each transmitted instance of the data signal has a temporal length of at least twice the predetermined temporal duration plus the length of an operation by the receiver to detect the presence of a signal on the communications path;
   successive detection instances in a set are temporally separated by the predetermined temporal duration; and
   the data signal comprises data repeated on a cyclic basis with a repetition period no longer than the predetermined temporal duration.

2. A device according to claim 1, in which the data transmitter and the data receiver are configured to operate in a half-duplex mode so that the data transmitter and the data receiver are configured to operate during respective complementary time periods.

3. A device according to claim 2, in which:
   the data signal comprises information identifying the device; and
   the data receiver is configured, as the processing operation, to receive a data signal from another device comprising information identifying that other device.

4. A device according to claim 3, in which the data receiver is configured, as the processing operation, to receive data from the communications path during an interval of at least the predetermined temporal duration.

5. A device according to claim 1, in which the device comprises a controller configured to control an interval between successive transmissions of the data signal.

6. A device according to claim 5, in which the controller is configured to set the intervals between successive transmissions of the data signal according to a pseudorandom distribution of intervals.

7. A device according to claim 5, in which the controller is responsive to one or more parameters of power supply to the device so as to vary the interval between successive transmissions of the data signal in response to a change in one or both of:
   a remaining quantity of stored energy available for power supply to the device; and
   the electrical power deliverable by a power supply to the device.

8. A device according to claim 1, in which:
   the data transmitter is configured to initiate transmission of the data signal in response to a first detection by the data receiver that the communications path is clear of other signals, after a detection by the data receiver of a signal on the communications path.

9. A device according to claim 1, in which the processing operation comprises one or more selected from the list consisting of:
   an exchange of identification data between the device and another device coupled to the communications path;
   an exchange of secure encryption key information between the device and another device coupled to the communications path;
   an initiation of a wireless telecommunications channel for communication, not via the communications path, between the device and another device coupled to the communications path; and
   generation and transmission of an instruction to initiate a mode of operation of another processing device.

10. A device according to claim 1, in which:
    the coupling is a capacitive coupling; and
    the signals are radio-frequency signals.

11. A device according to claim 1, comprising a detector configured to detect, from a signal received by the data receiver, one or more parameters of the communications path, the device being configured to select the processing operation according to the detected one or more parameters.

12. A device according to claim 1, comprising an approach detector configured to approach of a body towards the device, the device being configured to change a mode of operation in response to a detection of approach by the approach detector.

13. A telecommunications system comprising two or more devices according to claim 1.

14. A wearable data processing apparatus comprising a device according to claim 1, the coupling being disposed so that, in use, the communications path includes at least a part of the body of a wearer of the wearable data processing apparatus.

15. A method comprising:
    coupling signals to and from a communications path including at least a part of a human or animal body;
    transmitting, from time to time, a data signal of at least a predetermined temporal duration via the communications path;

detecting the presence of a signal on the communications path at sets of one or more successive detection instances disposed between successive transmissions of the data signal, such that the successive detection instances of a set are temporally separated by no more than the predetermined temporal duration;

initiating a processing operation in response to a detection of the presence of a signal on the communications path; wherein:

each transmitted instance of the data signal has a temporal length of at least twice the predetermined temporal duration plus the length of an operation by the receiver to detect the presence of a signal on the communications path;

successive detection instances in a set are temporally separated by the predetermined temporal duration; and the data signal comprises data repeated on a cyclic basis with a repetition period no longer than the predetermined temporal duration.

16. A non-transitory, computer readable storage medium storing computer software which, when executed by a computer, causes the computer to carry out the method of claim 15.

\* \* \* \* \*